UNITED STATES PATENT OFFICE.

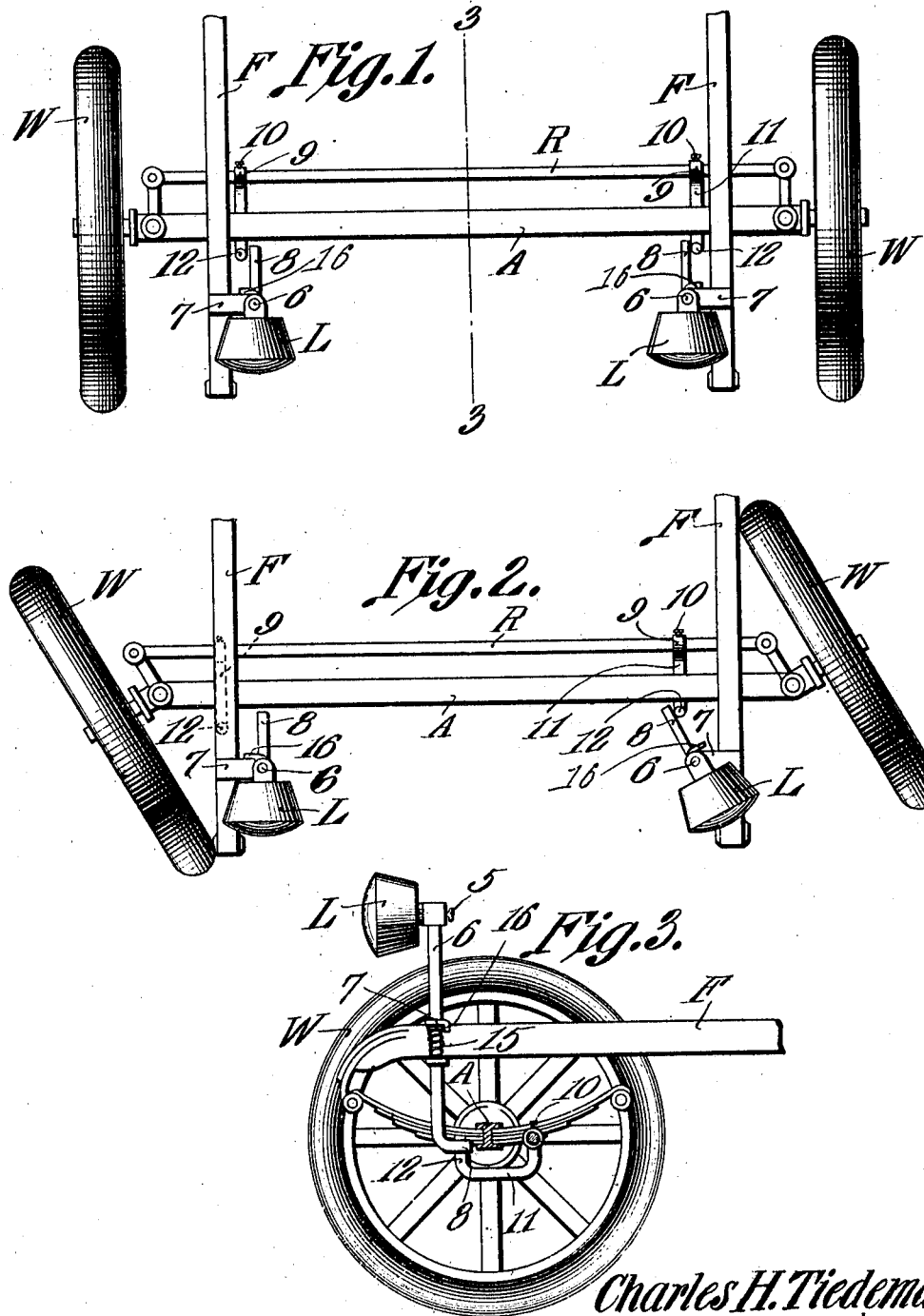

CHARLES H. TIEDEMANN, OF BUFFALO, NEW YORK, ASSIGNOR OF ONE-HALF TO WILLIAM S. BRICKELL, OF BUFFALO, NEW YORK.

DIRIGIBLE AUTOMOBILE LAMP-BRACKET.

1,031,398.  Specification of Letters Patent.  Patented July 2, 1912.

Application filed June 19, 1911. Serial No. 634,175.

*To all whom it may concern:*

Be it known that I, CHARLES H. TIEDEMANN, a citizen of the United States, residing at Buffalo, in the county of Erie and State of New York, have invented a new and useful Dirigible Automobile Lamp-Bracket, of which the following is a specification.

This invention relates to light supports, and more especially to those which are dirigible and are automatic in their action; and the object of the same is to produce an automobile lamp bracket or pair of brackets pivotally supported and so controlled by the movements of the steering gear that in making a turn the lamp on the outside of the curve will throw its rays straight ahead and that on the inside will direct its rays obliquely in the direction of the turn.

Dirigible light supports on automobiles are common in the present state of the art, it having been recognized as desirable to have the rays from the lamps directed straight forward when the machine is proceeding along a straight line, but directed obliquely when the machine is making a turn. But I have observed that when the light is thrown to the inner side of the turn the outer side is left almost in darkness, especially on an extremely dark or inclement night, and the driver, while he can now see clearly ahead on the inside of the turn, can discern little or nothing on the outside thereof and is in danger of striking the fence or a vehicle or pedestrian who is then no longer within his line of vision.

The purpose of the present invention is to cause one lamp to project its light always forward and to cause the other lamp to project its light obliquely toward the inside of a turn being made. It is true this may divide the course of the rays of light projected by both lamps, but there will yet be sufficient for the driver to see what he is approaching and the danger above mentioned will be avoided.

The following specification is a more detailed description of my invention, reference being had to the accompanying drawings wherein—

Figure 1 is a plan view of this attachment and the front end of an automobile which is progressing straight forward. Fig. 2 is a similar view with the steering wheels of the automobile turned in one direction. Fig. 3 is a sectional view on the line 3—3 of Fig. 1.

The frame F of the automobile carries an axle A to whose extremities are pivoted the steering wheels W which are connected by a rod R in rear of the axle so that they will turn in unison, and the lamps L carried by said frame are of the usual or any preferred type. Instead of mounting these lamps in brackets which are rigidly supported from the frame as usual, I attach each lamp as by a set screw 5 to an upright rod 6 which is journaled in ears 7 on the respective side of the framework and has a crank 8 at its lower end; and I provide two stops 9, each preferably attached by a set screw 10 or otherwise to the rod R, and each dropped as seen in Fig. 3 so as to pass under the axle A, but its extremity or front end 12 in any event standing in position to make contact with the crank 8. With the construction illustrated, the front ends 12 of the two stops stand just outside the cranks 8 of the two lamp brackets when the wheels W are parallel with the frame of the automobile and the latter is progressing straight forward as seen in Fig. 1. If now the driver turns the steering wheels, as for instance seen in Fig. 2, one stop (herein the left) moves away from its adjacent crank 8, but the other stop strikes its adjacent crank and causes the upright rod 6 to turn in its supporting ears 7 so that the rays of this lamp are directed parallel with the wheel adjacent whereas the rays from the other lamp are still projected straight forward. Therefore the last mentioned lamp will throw its rays on the high side or outside of the curve, whereas the other lamp will throw its rays on the low or inner side of the curve, and therefore the driver will have his path way well lighted and will be less liable to accident. When he resumes a straight line of travel, the lamp which has been deflected from its normal position is returned thereto by a spring 15 which may throw the finger 16 into contact with the upper ear 7. Each coiled spring 15 is arranged on the corresponding upright rod 6 between the ears 7 in which the upright rod is journaled, one extremity of the spring being secured to the upright rod and the other extremity to one of the said ears thereby tending to return the upright rod to normal position after it has been displaced therefrom.

A finger 16 is secured to each upright rod 6 and the finger 16 is bent downward to strike the upper ear to retain the upright rod in normal position.

What is claimed is:

The combination with a vehicle frame, an axle, steering wheels pivoted to the axle, and a rod connecting the said wheels, of a pair of ears secured to each side of the frame, upright rods journaled in the ears and having cranks on their lower ends, coiled springs on the upright rods between the ears having one extremity secured to the upright rods and the other extremity secured to one of the corresponding ears, fingers secured to the upright rods and bent downward to strike the upper ears to retain the upright rods in normal position, lamps carried by the upright rods, and stops secured to the former rod and arranged to strike the respective cranks, as and for the purpose specified.

In testimony that I claim the foregoing as my own, I have hereto affixed my signature in the presence of two witnesses.

CHARLES H. TIEDEMANN.

Witnesses:
    WM. S. BRICKELL,
    JAS. F. LOFTUS.